United States Patent [19]

Gasper et al.

[11] 4,383,079

[45] May 10, 1983

[54] EXTENSION OF POLYURETHANE HYDROGEL CURE TIME

[75] Inventors: Alton J. Gasper, Minneapolis; James N. Wells, Cottage Grove, both of Minn.

[73] Assignee: Minnesota Mining and Manufacturing Company, St. Paul, Minn.

[21] Appl. No.: 252,374

[22] Filed: Apr. 9, 1981

[51] Int. Cl.³ ............................................. C08G 18/30
[52] U.S. Cl. ................................. 524/767; 521/117; 521/904; 521/905; 528/49; 528/905
[58] Field of Search ............... 521/107, 102, 117, 121, 521/128, 125, 905; 528/904, 48, 51, 49, 52, 57; 260/29.2 TN; 524/710, 725, 745, 767

[56] References Cited

U.S. PATENT DOCUMENTS

| | | | |
|---|---|---|---|
| 2,938,005 | 5/1960 | Bick et al. | 521/121 |
| 3,002,937 | 10/1961 | Parker et al. | 521/128 |
| 3,471,423 | 10/1969 | Elmer et al. | 521/128 |
| 3,719,050 | 3/1973 | Asao et al. | 166/295 |
| 3,723,393 | 3/1973 | Kistner | 260/77 |
| 3,793,240 | 2/1974 | Smith | 260/2.5 AB |
| 3,805,531 | 4/1974 | Kistner | 260/29 |
| 3,805,532 | 4/1974 | Kistner | 260/2.5 |
| 3,894,131 | 7/1975 | Speech | 264/45.2 |
| 3,985,688 | 10/1976 | Speech | 260/2.5 |
| 4,118,354 | 12/1978 | Harada et al. | 260/29.2 |
| 4,191,815 | 3/1980 | Jourquin et al. | 521/905 |
| 4,193,887 | 3/1980 | Stone et al. | 521/121 |
| 4,209,605 | 6/1980 | Hoy et al. | 528/904 |
| 4,220,727 | 9/1980 | Godlewski | 521/128 |
| 4,241,537 | 12/1980 | Wood | 521/905 |
| 4,293,679 | 10/1981 | Cogliano | 528/49 |
| 4,315,703 | 2/1982 | Gasper | 405/52 |

FOREIGN PATENT DOCUMENTS

| | | | |
|---|---|---|---|
| 53-66997 | 6/1978 | Japan | 528/48 |
| 1486232 | 9/1977 | United Kingdom . | |

*Primary Examiner*—H. S. Cockeram
*Attorney, Agent, or Firm*—Cruzan Alexander; Donald M. Sell; Richard Francis

[57] ABSTRACT

The cure time of polyurethane prepolymer curable with water to form polyurethane hydrogel is prolonged by the addition to the water of certain micelle-forming adducts which substantially extend the cure time.

2 Claims, No Drawings

EXTENSION OF POLYURETHANE HYDROGEL CURE TIME

DESCRIPTION

1. Technical Field

The invention relates to curable compositions which form polyurethane hydrogels and, more specifically, to prolonging the cure time of such compositions by the addition of an adduct to form a cure-inhibiting concentration of micelles of the adduct.

2. Background Art

Hydrogels comprising polyurethane prepolymers which react with water to form a crosslinked matrix are well known, as exemplified by U.S. Pat. Nos. 3,894,131 (Speech); 3,805,531 (Kistner); 3,723,393 (Kistner); 3,719,050 (Asao et al); 4,188,354 (Harada et al); 3,805,532 (Kistner); 3,985,688 (Speech); British Patent Specification 1,486,232 (Minnesota Mining and Manufacturing Company); and U.S. patent application Ser. No. 51,878, filed June 25, 1979, assigned to the assignee of the present application. Compositions curable to form such hydrogels have been used for soil stabilization and in sealing applications. In such use, a water-dispersible polyurethane prepolymer curable to form the hydrogel is typically introduced into structures and/or into soil adjacent such structures or into soil per se where it cures to form the hydrogel. The effectiveness of such compositions many times depends upon the extent or degree of penetration into the soil.

While the disclosed polyurethane prepolymers curable to the polyurethane hydrogels have generally found a certain degree of success and utility, they have had one common deficiency which may cause problems under certain circumstances. They may cure too fast and thereby cause handling problems and limit such penetration into the soil or other structure. The cure times of the polyurethane prepolymers are generally established by the types and proportions of ingredients being used, temperature of use and reaction rate. Cure times may be extended by modification of proportions of ingredients. Certain modifiers are also known to alter the cure time. For example, aforementioned U.S. Pat. No. 3,719,050 suggests that the gelling time of polyurethane prepolymer may be shortened by the addition of a basic material and prolonged by the addition of an acidic material or a chelate compound. Such acidic additives commonly cause undesirable modification in the physical properties of the resultant gel, such as weakening its cohesive strength.

DISCLOSURE OF INVENTION

The present invention provides an improved method of curing diisocyanate-terminated polyurethane prepolymer curable in the presence of water to form a hydrogel. Such curing includes the step of reacting the prepolymer in the presence of sufficient water to form the hydrogel. The improvement comprises adding sufficient micelle-forming adduct to the water to significantly extend the cure time of the prepolymer. As used herein, the term "micelle-forming adduct" refers to various chemical compounds which, when added to water, will aggregate to form a micelle-containing aqueous solution. Micelles are aggregates of a number of molecules of the adduct held together by secondary bonds. Not all micelle-containing aqueous solutions extend the cure time of polyurethane prepolymers. Micelle-forming adducts for use in the present invention include certain alcohols. When employing the useful micelle-forming adducts, the extension of the cure time generally is directly proportional to the concentration of micelles in the solution within the useful range.

In a preferred composition, the weight ratio of micelle-forming adduct to polyurethane prepolymer is in the range of about 1:20–1:1, with the exact amount of micelle-forming adduct being selected to obtain a desired cure time. Some minor experimentation may be required to select the appropriate amount of adduct since there may be differences in the micelle-forming abilities of the various useful adducts herein defined.

BEST MODE FOR CARRYING OUT THE INVENTION

The method of the present invention comprises reacting a fluid mixture comprised of water-dispersible polyurethane prepolymer which may include a water-miscible organic solvent with sufficient water to provide a hydrogel and sufficient micelle-forming adduct to extend the cure or gel time to a desirable time. The micelle-forming adducts found to be useful in the present invention include certain alcohols.

Alcohols having the general formula $H(CH_2)_x(OH)_y$ wherein x is 1–6 and y is 1–3 provide useful micelle-forming adducts. Useful alcohols include isopropyl alcohol, n-butyl alcohol, t-butyl alcohol, amyl alcohol, 2-methoxyethanol (available under the trade designation methyl "Cellosolve"), 2-butoxy ethanol (available under the trade designation butyl "Cellosolve"), 2-($\beta$-butoxy) ethanol (available under the trade designation butyl "Carbitol"), butane diol and certain alcohol mixtures such as absolute alcohol (95% ethanol and 5% isopropanol).

The polyurethane prepolymer useful in the present invention is characterized by having terminal isocyanate groups formed by reacting polyether polyol having at least two terminal hydroxyl groups and a number average molecular weight between about 3,000 and 20,000, preferably 4,000 to 10,000, and having random ethylene oxide units and higher alkylene oxide units in a mol ratio of ethylene oxide to higher alkylene oxide of 1:1 to 4:1, and sufficient polyisocyanate compound having at least two terminal isocyanate groups to provide an NCO:OH ratio from about 5:1 to about 1.05:1. The higher alkylene oxide is selected from the group consisting of propylene oxide, butylene oxide, pentylene oxide, hexylene oxide and mixtures thereof.

Water-soluble isocyanate-terminated prepolymer useful in this invention may be expressed in terms of the formula $R^4[(R^5O)_a—C(O)NH—R^6(NCO)_b]_c$ wherein $R^4$ is an active hydrogen-free residue of a polyether polyol, e.g., ethylene glycol, glycerol, or 1,1,1-trimethylolpropane, $(R^5O)_a$ is a hydrophilic poly(oxyalkylene) chain having a plurality of randomly distributed oxyethylene and higher oxyalkylene units. The subscript "a" is the number of oxyalkylene units in the poly(oxyalkylene) chain, this number being sufficient to impart water-solubility and preferably non-crystallinity to the prepolymer. The moiety —C(O)NH— together with the adjacent oxygen atom of the poly(oxyalkylene) chain is a carbamate (or urethane) group resulting from the reaction of a hydroxy group from polyether polyol precursor with an isocyanate moiety from a polyisocyanate precursor. $R^6$ is a residue or nucleus of the polyisocyanate precursor, and is preferably an aromatic nucleus, e.g., tolylene, and "b" is an integer, generally 1–5 where "b" is the number of isocyanate moieties of the polyisocyanate precursor. The subscript "c" will be 2-6. The terminating isocyanate groups can react with water, resulting in the formation of a gelled mass.

Preferred water-soluble prepolymers within the scope of this invention are those of the formula:

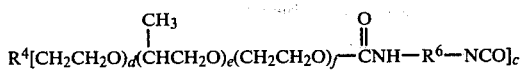

where $R^4$, $R^6$, and "c" are as defined above, "d", "e" and "f" are integers such that the ratio of (d+f):e is 1:1 to 4:1.

When these prepolymers are used in the application of this invention, the polyurethane prepolymer reacts with the water mixed with the prepolymer, forming in situ a cross-linked, cured poly(urethane-urea) polymer gel. The mixture of water and prepolymer initially forms a low viscosity mass, typically having a viscosity of about 5 to 10 cps when measured with a Brookfield Viscometer at 25° C. using a UL adapter rotated at 50 rpm., which, in a very short period of time, cures to form a cross-linked gelled mass having an infinite viscosity. Depending upon the amount of fillers and other additives, the initial viscosity of the viscous mass typically varies between 5 and 1000 cps, the viscosity being higher at higher loadings of additives.

The unmodified curable polyurethane prepolymer compositions, when reacted with water, form a gelled mass in a very short time, e.g., about 5-200 seconds, although the time necessary to gel will vary depending on the ambient temperature, with a longer cure time usually being necessary in colder conditions. Depending upon the amount of adduct added, the gel time may be extended from about 5 times to about 500 times the gel time of the unmodified compositions.

The isocyanate-terminated prepolymers used in this invention can be tailored in structure to obtain controlled water-solubility in order to attain practical reaction times and achieve desired physical properties in the gelled mass.

The preparation of isocyanate-terminated prepolymers and the reaction thereof with water to form a polyurea, is disclosed in the art e.g., U.S. Pat. Nos. 2,726,219, 2,948,691, 3,719,050, 3,985,688 and Canadian Patent No. 1,035,521 and "Polyurethanes: Chemistry and Technology" by Saunders and Frisch, Part I, Interscience Pub., N.Y. (1962).

The urethane prepolymers used in this invention can be prepared by reacting an aliphatic or aromatic polyisocyanate with a polyoxyethylene-containing polyol using an NCO/OH equivalent ratio in the range of about 5:1 to about 1.05:1.

To insure water-miscibility, the polyether polyol will generally have a molecular weight range of about 3,000-20,000, preferably 4,000 to 10,000. Commercially available polyol precursors useful in making the above-described water-soluble isocyanate-terminated prepolymers are the hydrophilic polyols, e.g., "Carbowax". The degree of overall hydrophilicity of the prepolymeric mixtures can be modified by using small amounts of poly(oxyethylene-oxypropylene) polyols sold under the trademark "Pluronic", such as Pluronic-L35, F38, and P46, or hydrophilic polyols with heteric oxyethylene-oxypropylene chain sold as Polyol Functional Fluids, such as WL-580, WL-600, and WL-1400.

Polyisocyanates which can be used to prepare the isocyanate-terminated prepolymer used in this invention and described above include conventional aliphatic and aromatic polyisocyanates. The preferred polyisocyanates are aromatic polyisocyanates because the prepolymers made therefrom will generally react faster with water. One of the most useful polyisocyanate compounds which can be used for this purpose is tolylene diisocyanate, particularly as a blend of 80 weight percent of tolylene-2,4-diisocyanate, and 20 weight percent of tolylene-2,6-diisocyanate; a 65:35 blend of the 2,4- and 2,6-isomers is also useable. These polyisocyanates are commercially available under the trademark "Hylene" TM, "Nacconate" 80, and "Mondur" RD-80. Other useable polyisocyanate compounds which can be used are other isomers of tolylene diisocyanate, hexamethylene-1,6-diisocyanate, diphenyl-methane-4,4'-diisocyanate, m- or p-phenylene diisocyanate and 1,5-naphthalene diisocyanate. Polymeric polyisocyanates can also be used, such as polymethylene polyphenyl polyisocyanates, such as those sold under the trademarks, "Mondur" MRS, and "PAPI". A list of useful commercially available polyisocyanates is found in *Encyclopedia of Chemical Technology* by Kirk and Othmer, 2nd Ed., Vol. 12, pages 46, 47, Interscience Pub. (1967).

If needed, the polyurethane prepolymer may be dissolved in a suitable water-miscible organic solvent to facilitate handling. The solvents which may be used, if needed, to dissolve the prepolymers are water-miscible, polar organic solvents which are preferably volatile at the ambient conditions. A solution of about 60-90 weight percent of prepolymer solids in dry acetone is a very effective sealant composition. Other useful water-miscible or water semi-miscible solvents include methyl acetate, tetrahydrofuran, dimethyl formamide, ethylene glycol monoethyl ether acetate (sold under the trade designation "Cellosolve" acetate) and diethyl acetal, ethylene glycol monobutyl ether acetate (available under the trade designation butyl "Cellosolve" acetate), 2-ethyl hexyl acetate, diethylene glycol monobutyl ether acetate (available under the trade designation butyl "Carbitol" acetate) and glycol diacetate.

From about 1 to 30 percent by weight (based upon the total weight) of certain water-immiscible liquids may also be added to the prepolymer as a diluent to lower viscosity and provide a blend which is dispersible in the micelle-containing aqueous phase. Such water-immiscible liquids include phthalate ester plasticizers such as butyl benzyl phthalate, dioctyl phthalate, dibutyl phthalate, di-2-ethyl hexyl phthalate and diisodecyl phthalate, adipic acid esters such as octyl decyl adipate, diisoctyl adipate and diisobutyl adipate, esters and diesters of acids such as sebacic, maleic, azelaic and stearic.

Specifically, compositions according to the present invention are two-part curable compositions suited when mixed for sealing water-bearing and water-holding structures and for reinforcing soil. One part, hereinafter referred to as "Part A", comprises a fluid mixture comprising water-soluble, preferably non-crystallizing polyurethane prepolymer having terminal isocyanate groups, defined above, and water-miscible organic solvent, if needed, to render the prepolymer fluid, and a second part, hereinafter referred to as "Part B", comprising sufficient aqueous micelle-forming adduct solution to provide a desired cure rate and sufficient water to provide a weight ratio of water to prepolymer on the order of 5:1 to 25:1 (preferably 10:1 to 20:1) and to provide a gelled mass.

The water-reaction product of the prepolymer is a gelatinous mass, sometimes referred to herein as a gel or hydrogel. While the reaction produces by-product carbon dioxide, which normally produces a foamed structure in a cured polyurethane, foaming of the gelatinous mass is normally not noted since the amount of carbon dioxide by-product produced will generally be readily dissolved in the water contained within the gelatinous mass and/or readily liberated from the water or the gelling mass because of the low viscosity of the gelling mass.

Filler materials may be used in the curable compositions disclosed with respect to the present invention to provide a more shrink-resistant, substantially incompressible cured composition. For this purpose, any of a number of filler compositions have been found to be particularly effective. Useful fillers include water-insoluble particulate filler material having a particle size of about less than 500 microns, preferably 1 to 50 microns and a specific gravity in the range of 0.1 to 4.0, preferably 1.0 to 3.0. The filler content of the cured composition may be as much as 60 parts filler per 100 parts by weight cured composition, preferably 5 parts to 20 parts per 100. Useful fillers include silica, alumina, diatomaceous earth, carbon black and the like.

Other additive ingredients may be included in the composition of the present invention. For example, viscosity modifiers may be included to increase or decrease the viscosity, depending on the desired result, to make the composition more adaptable to particular equipment. Additionally, fungicides may be added to prolong the life of the gel and to prevent attack by various fungi. Other active ingredients may be added for various purposes, such as substances to prevent encroachment of plant roots, and the like. Care should be exercised in choosing fillers and other additives to avoid any materials which will have a deleterious effect on the viscosity, reaction time, and the stability of the gel being prepared.

The invention is further illustrated by reference to the following examples wherein all parts are by weight, unless otherwise designated.

EXAMPLES

Polyurethane Prepolymer

An 80% solids solution in acetone of a tolylene diisocyanate capped 5000 molecular weight triol having a 70:30 mole ratio of oxyethylene to oxypropylene units and an initial equivalence ratio of toluene diisocyanate to polyol of 2.2:1.

Gel Time Determination Test

The following steps were followed to determine the gel times set forth in the examples.

1. Ten grams of the polyurethane prepolymer described above were placed in a 6 oz. plastic-lined paper cup.
2. One hundred grams of a solution of the designated micelle-forming adduct in deionized water were placed into a second 6 oz. plastic-lined paper cup.
3. The temperature of the water solution was maintained between 65° F. (18° C.) and 70° F. (21° C.).
4. The water solution was rapidly poured into the cup containing the polyurethane prepolymer and simultaneously the time in seconds was monitored.
5. The mixture was stirred vigorously for 5 seconds and then poured back and forth between the two cups at a rate of approximately once every 10 seconds.
6. The time elapsed until the solution will not flow from one cup to another was taken as the gel time.

In the following examples, control examples are designated by letters A-J and examples according to the present invention are designated by numbers 1-36.

Ten parts of the polyurethane prepolymer described above were utilized with 100 parts water containing the designated micelle-forming adduct unless otherwise specified. Gels made with varying amounts of micelle-forming adduct were compared with gels containing no adduct, as shown in the table.

Ten parts of the polyurethane prepolymer described above were mixed with various mixtures of water and isopropanol, the micelle-forming adduct.

TABLE

| Ex. | Prepolymer | Water | Isopropanol | Gel Time |
|-----|------------|-------|-------------|----------|
| G   | 10         | 100   | —           | 40 sec.  |
| 20  | 10         | 90    | 10          | 46 sec.  |
| 21  | 10         | 80    | 20          | 1.2 min. |
| 22  | 10         | 70    | 30          | 2 min.   |
| 23  | 10         | 60    | 40          | 3.4 min. |
| 24  | 10         | 50    | 50          | 5.7 min. |
| 25  | 10         | 40    | 60          | 7.8 min. |

We claim:

1. A method of curing diisocyanate-terminated polyurethane prepolymer curable in the presence of water to form a hydrogel including the step of reacting said prepolymer in the presence of sufficient water to form a hydrogel, the improvement comprising adding sufficient micelle-forming adduct to said water to significantly inhibit the cure rate of said prepolymer, wherein said micelle-forming adduct is an alcohol having the general formula $H(CH_2)_x(OH)_y$ where x is 1-6 and y is 1-3.

2. A composition curable to form a polyurethane hydrogel comprising:
(a) polyurethane prepolymer having terminal isocyanate groups; and
(b) water containing sufficient cure-inhibiting micelle-forming adduct to provide a weight ratio of adduct to polyurethane prepolymer in the range of about 1:20 to 1:1, wherein said micelle-forming adduct is an alcohol having the general formula $H(CH_2)_x(OH)_y$ where x is 1-6 and y is 1-3.

* * * * *